(12) United States Patent
Meyer

(10) Patent No.: US 9,007,459 B2
(45) Date of Patent: Apr. 14, 2015

(54) METHOD TO MONITOR AN AREA

(75) Inventor: Michael Meyer, Sibbesse (DE)

(73) Assignee: Robert Bosch GmbH, Stuttgart (DE)

( * ) Notice: Subject to any disclaimer, the term of this patent is extended or adjusted under 35 U.S.C. 154(b) by 562 days.

(21) Appl. No.: 13/388,326

(22) PCT Filed: Jun. 11, 2010

(86) PCT No.: PCT/EP2010/058199
§ 371 (c)(1),
(2), (4) Date: Feb. 29, 2012

(87) PCT Pub. No.: WO2011/015401
PCT Pub. Date: Feb. 10, 2011

(65) Prior Publication Data
US 2012/0147182 A1 Jun. 14, 2012

(30) Foreign Application Priority Data
Aug. 4, 2009 (DE) .................. 10 2009 028 212

(51) Int. Cl.
*H04N 7/18* (2006.01)
*G06K 9/00* (2006.01)

(52) U.S. Cl.
CPC ........ G06K 9/00771 (2013.01); G06K 9/00778 (2013.01)

(58) Field of Classification Search
CPC .......... G08B 13/196; G08B 13/19604; G08B 13/19606; G08B 13/19608
See application file for complete search history.

(56) References Cited

U.S. PATENT DOCUMENTS

| 7,130,468 | B1 | 10/2006 | Meyer et al. | |
|---|---|---|---|---|
| 7,738,009 | B2 | 6/2010 | Rottmann | |
| 2002/0125435 | A1* | 9/2002 | Cofer et al. | 250/341.1 |
| 2004/0146203 | A1* | 7/2004 | Yoshimura et al. | 382/218 |
| 2010/0077297 | A1* | 3/2010 | Hori | 715/243 |
| 2012/0268274 | A1* | 10/2012 | Wieser | 340/545.2 |
| 2013/0002845 | A1* | 1/2013 | Fedorenko et al. | 348/77 |

FOREIGN PATENT DOCUMENTS

DE 19938845 3/2000

OTHER PUBLICATIONS

"Chapter 2—Identifying Regions of Interest in Image Sequences" in: Javed Omar, Shah Mubarak: "Automated Multi-Camera Surveillance -Algorithms and Practice" 2008, Springer Sciene+Business Media, LLC, New York, US, XP002592115 ISBN: 978-0-387-78880-7, pp. 11-28.
PCT/EP2010/058199 International Search Report dated Jul. 30, 2010 (3 pages).

* cited by examiner

*Primary Examiner* — Huy T Nguyen
(74) *Attorney, Agent, or Firm* — Michael Best & Friedrich LLP

(57) ABSTRACT

A method to monitor an area (18) and a monitoring device (10) to implement the method are presented. In the method, using a camera (11) at least one image of the area (18) is recorded and compared with a reference image assigned to the area (18).

12 Claims, 1 Drawing Sheet

METHOD TO MONITOR AN AREA

BACKGROUND OF THE INVENTION

The invention relates to a method to monitor an area and a device for carrying out the method.

In publicly accessible, highly frequented buildings such as in supermarkets, theaters and sports halls, for example, it is necessary to provide emergency exits. In this case, it is of importance, in particular, that emergency exits are sufficiently available. It is necessary to ensure that these emergency exits are not blocked with any objects, in order that their effectiveness is not impaired. However, at present no suitable technical means are known for effectively and reliably identifying an obstruction of emergency exits.

This is because e.g. light barriers are used for monitoring purposes. In the case of these light barriers, however, it has emerged that they are too complicated to monitor entire areas. A further possibility is afforded by the use of weight sensors installed in the ground. However, these can only be installed with high structural outlay.

A further known approach consists in monitoring affected areas by means of a video camera. Currently known methods for monitoring by means of a video camera are based on the principle of identifying image brightness changes. However, these methods are very sensitive to changes in the illumination conditions and are therefore not sufficiently robust.

Methods to monitor areas and in particular to monitor persons in said areas are known.

The document DE 102 10 926 A1 describes a device and a method for tracking at least one object in a scene. In the method, if a moving object stops moving and comes to a standstill, the duration of staying at a standstill is counted. Depending on the aforesaid duration, a signaling is generated. In this case, the object is described by a list or a matrix with regard to the direction of movement and the time. In this way, an atypical behavior pattern is identified in the monitored scene in which moving objects are usually situated.

SUMMARY OF THE INVENTION

The invention serves, in particular, to identify the obstruction of areas or surfaces permanently, i.e. robustly.

The invention relates to a method to monitor an area, wherein, by means of a camera, at least one image of the area is captured and is compared with a reference image assigned to the area.

The invention furthermore relates to a surveillance device, designed in particular for carrying out the method. Said surveillance device comprises a camera, in particular a video camera, designed to capture at least one image of the area to be monitored, a memory unit or an image memory, in which a reference image is stored, and an image evaluation unit, which is designed to compare the captured image with the reference image.

The method presented enables an obstruction of areas or surfaces to be identified reliably and robustly. The advantage of using a camera, generally a video camera, consists, in particular, in that said camera can be mounted below the ceiling in a simple manner. Consequently, no structural measures are required. Furthermore, the method described, at least in some of the embodiments, is particularly robust toward changes in illumination in the area to be monitored.

The other advantages and configurations of the invention will become apparent from the description and the accompanying drawing.

It goes without saying that the features mentioned above and those yet to be explained below can be used not only in the combination respectively specified, but also in other combinations or by themselves, without departing from the scope of the present invention.

DETAILED DESCRIPTION

Figure 1:
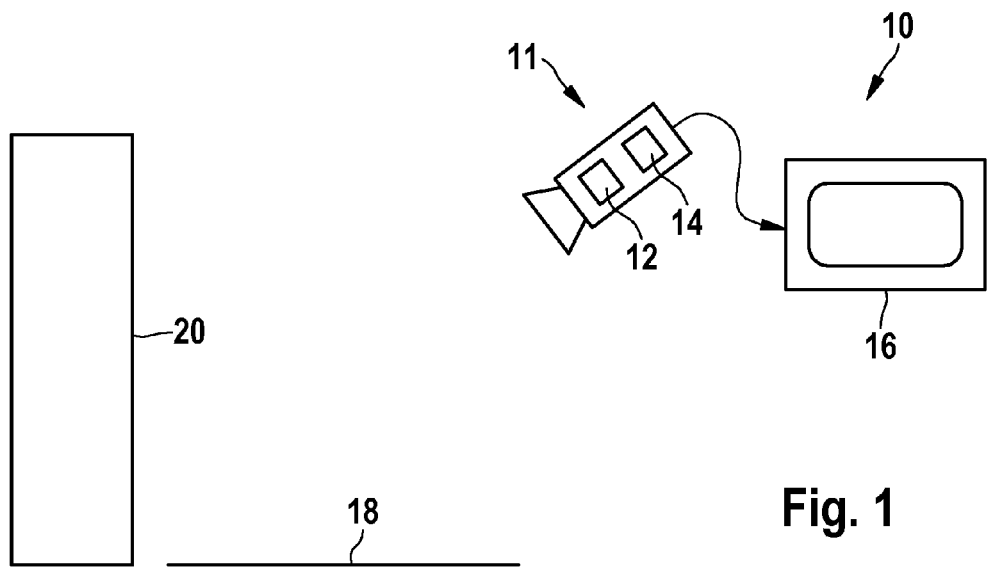
FIG. 1 shows, in schematic illustration, an embodiment of the surveillance device presented.

The invention is illustrated schematically on the basis of embodiments in the drawings and is described thoroughly below with reference to the drawings.

FIG. 1 shows a surveillance device 10 comprising a camera 11, in this case a video camera, having an integrated image evaluation unit 12 or an image memory and an integrated memory unit 14. Furthermore, the camera 11 is connected to a computing device 16. By way of example, a mobile computer or a laptop can be used as the computing device 16. An area 18 or an open space in front of an emergency exit 20 is monitored by means of the camera 11.

The camera 10 thus serves to monitor the area 18 in which no objects are permitted to be placed. Usually, when setting up or starting up the surveillance device 10, a current camera image of the area 18 to be monitored is recorded and stored as a reference image in the integrated memory device 14. Alternatively, a reference image created by a different recording device can also be stored. Furthermore, it is possible to update said reference image at specific points in time. This can be carried out at regular time intervals or else in an event-dependent manner. If the reference image is replaced at regular time intervals, changing ambient influences, such as e.g. changing light conditions, can be taken into account better.

With the aid of the laptop 16 connected to the camera 11, the areas relevant in the image can be parameterized and further parameters can be set. Afterward, particularly suitable image features of current images can be compared with image features of the reference image and a measure of similarity can be determined in this way. If the measure of similarity falls below a threshold for the duration of a trigger time that can be set, then an alarm, e.g. in the form of an acoustic signal, is usually given.

The comparison of the current captured image with the reference image can be effected in the image evaluation unit 12 in the camera 11. Alternatively, this comparison can also be effected by means of program steps stored in the laptop 16.

Figure 2:
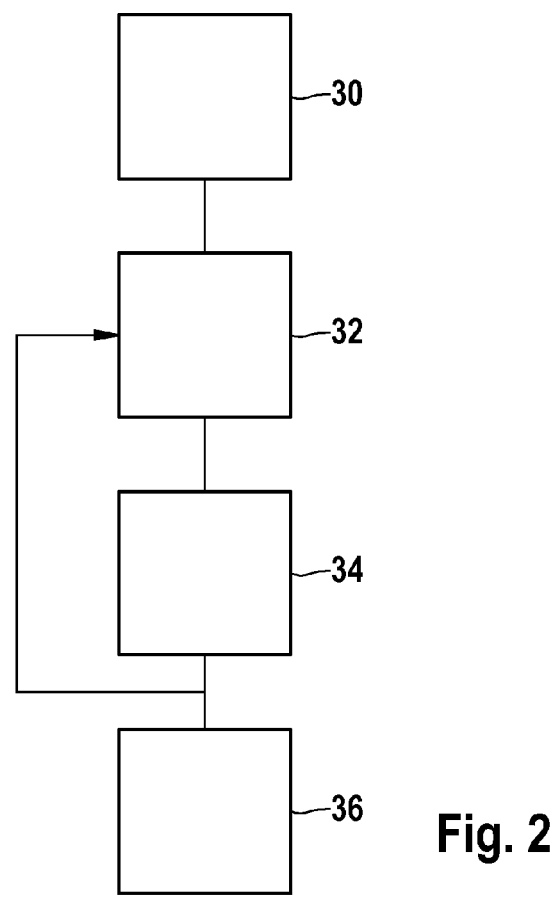
FIG. 2 shows, in a flow chart, the sequence of an implementation of the method described.

FIG. 2 illustrates a possible course of the method described. In step 30, a suitable reference image is generated and stored. In step 32, a current image is captured. In this case, it is appropriate to capture a current image at regular intervals, e.g. once per second. In step 34, the captured image is compared with the aid of established algorithms. If the comparison reveals a critical deviation, an alarm is effected in step 36. Otherwise, steps 32 and 34, the capturing of the current image and the comparison, are repeated.

The method proposed here can be based on the insight, for example, that objects placed can always be identified by new edges. Such edges can be identified from a high spatial gradient in the video image. Therefore, the following algorithm is used for identification purposes.

1. Determine all location in the image at which
   a. a high gradient is present in the current image b. no high gradient can be identified in the reference image (the edge must be new!)

2. Determine the normalized cross-correlation coefficient between the gradients in the reference image and the gradients in the current image using only the locations determined in step 1.

3. Compare the cross-correlation coefficient with a threshold that can be set. If the threshold is undershot, then the area is identified as "occupied".

4. The comparison described above is carried out regularly e.g. once per second. If "occupied" is identified within a set trigger time (e.g. one minute) during each comparison described above, then an alarm is triggered.

What is claimed is:

1. A method to monitor an area (18) wherein a camera (11) captures at least one image of the area (18), and the captured at least one image of the area (18) is compared with a reference image assigned to the area (18), wherein the comparison is carried out on the basis of spatial gradients that are identified in the captured at least one image of the area (18), wherein the method further comprises determining a normalized cross-correlation gradient between spatial gradients in the reference image and the spatial gradients in the captured at least one image of the area (18), and wherein the comparison includes detecting edges of objects based on the spatial gradients in the captured at least one image of the area (18).

2. The method as claimed in claim 1, wherein a number of images are captured.

3. The method as claimed in claim 2, wherein an image sequence is captured.

4. The method as claimed in claim 2, wherein the comparison is effected time-continuously.

5. The method as claimed in claim 1, wherein the comparison is carried out at discrete points in time.

6. The method as claimed in claim 1, wherein areas that are relevant in the reference image are parameterized.

7. The method as claimed in claim 1, wherein, on the basis of the comparison, a measure of similarity between reference image and captured image is determined and an alarm signal is output starting from a certain deviation.

8. The method as claimed in claim 1, wherein an obstruction of the area (18) with objects is identified.

9. A surveillance device for carrying out a method as claimed in claim 1, comprising a camera (11) designed to capture at least one image of an area (18) to be monitored, a memory device (14), in which a reference image is stored, and an image evaluation unit (12), which is designed to compare the captured image with the reference image.

10. The surveillance device as claimed in claim 9, wherein the area (18) to be monitored is in front of an emergency exit.

11. The method as claimed in claim 1, wherein the area (18) to be monitored is in front of an emergency exit.

12. The method as claimed in claim 1, wherein the reference image is updated at regular time intervals.

* * * * *